United States Patent
Cutler et al.

(10) Patent No.: US 10,190,245 B1
(45) Date of Patent: Jan. 29, 2019

(54) CATHEDRAL WINDOW QUILT KIT

(71) Applicants: Billie Cutler, Twin Falls, ID (US); Charlene Cutler, Twin Falls, ID (US)

(72) Inventors: Billie Cutler, Twin Falls, ID (US); Charlene Cutler, Twin Falls, ID (US)

( * ) Notice: Subject to any disclaimer, the term of this patent is extended or adjusted under 35 U.S.C. 154(b) by 0 days.

(21) Appl. No.: 15/657,466

(22) Filed: Jul. 24, 2017

(51) Int. Cl.
*G01B 3/14* (2006.01)
*D05B 97/12* (2006.01)
*D05B 11/00* (2006.01)

(52) U.S. Cl.
CPC .............. *D05B 97/12* (2013.01); *D05B 11/00* (2013.01); *G01B 3/14* (2013.01)

(58) Field of Classification Search
CPC ........................................................ D05B 97/12
USPC ............................................ 33/566, 562, 563
See application file for complete search history.

(56) References Cited

U.S. PATENT DOCUMENTS

| | | | |
|---|---|---|---|
| 5,749,149 A * | 5/1998 | Claytor | B26B 29/06 33/1 F |
| 5,823,086 A | 10/1998 | McCormick | |
| 6,276,070 B1 * | 8/2001 | Hawley | B43L 7/033 33/1 G |
| 6,925,724 B2 | 8/2005 | Tandy | |
| 7,281,337 B1 | 10/2007 | Oehlke et al. | |
| 7,568,295 B1 * | 8/2009 | Strain | D05B 97/12 33/1 B |
| 7,730,842 B1 * | 6/2010 | Sebrow | D05B 11/00 112/117 |
| 7,854,073 B1 * | 12/2010 | Webb | D05B 97/12 33/1 G |
| 8,186,072 B1 * | 5/2012 | Nethery | D05B 97/12 33/11 |
| 2003/0066216 A1 * | 4/2003 | deCarteret | D05B 97/12 38/102 |
| 2005/0252019 A1 * | 11/2005 | Gordon | B43L 13/20 33/566 |
| 2009/0025245 A1 * | 1/2009 | Brady | B26B 29/06 33/562 |
| 2009/0113737 A1 * | 5/2009 | Graham | A41H 3/01 33/562 |
| 2009/0158602 A1 * | 6/2009 | Lockyer | B43L 7/005 33/1 B |
| 2010/0223798 A1 * | 9/2010 | Zimmerman | B43L 7/027 33/494 |
| 2015/0322609 A1 * | 11/2015 | Breuker | D05B 97/12 33/565 |

* cited by examiner

*Primary Examiner* — Christopher Fulton

(57) ABSTRACT

A cathedral window quilt kit for a modernized quilting technique to create cathedral-window quilts in a fun and simple manner. The kit includes a transparent template with an integrated ruler, as well as colored cut lines to ensure neatness and squareness. The kit also includes a plurality of silk pins, a plurality of T-pins, a cut-and-press pad, a rotary cutter, a snap wrist ruler, a friction marker, and a case. The case has a plurality of indentations, with one of the transparent template, the plurality of silk pins, the plurality of T-pins, the cut-and-press pad, the rotary cutter, the snap wrist ruler, and the friction marker selectively receivable within one of the plurality of indentations.

1 Claim, 4 Drawing Sheets

CATHEDRAL WINDOW QUILT KIT

BACKGROUND OF THE INVENTION

Various types of quilt kits are known in the prior art. However, most existing kits, particularly those for antique cathedral window quilts, are difficult to use and are designed for use with traditional quilting techniques. What is needed, and what the present cathedral window quilt kit provides, is a modernized quilting technique and an all-inclusive kit to create cathedral-window quilts in a fun and easy manner. The kit includes an innovative transparent template with an integrated ruler and easily distinguishable red cut lines to ensure neatness and squareness. The kit also has every tool required to complete the quilt other than fabric and standard sewing supplies, including silk pins, T-pins, a cut-and-press pad, a rotary cutter, a snap wrist ruler, and a friction marker. The entirety of the kit comes in a custom case with a compartment for each item.

FIELD OF THE INVENTION

The present invention relates to quilts, and more particularly, to a cathedral window quilt kit.

SUMMARY OF THE INVENTION

The general purpose of the present cathedral window quilt kit, described subsequently in greater detail, is to provide a cathedral window quilt kit that has many novel features that result in a cathedral window quilt kit which is not anticipated, rendered obvious, suggested, or even implied by prior art, either alone or in combination thereof.

To accomplish this, the present cathedral window quilt kit includes a transparent template having a top side, a bottom side, a north side, a south side, an east side, a west side, a northeast corner, a northwest corner, a southwest corner, a southeast corner, a center, an L-shaped ruler, a plurality of cut lines, a plurality of first holes, and a plurality of second holes. A circumference of each of the plurality of second holes is less than a circumference of each of the plurality of first holes.

The L-shaped ruler has a plurality of demarcations disposed within the top side of the transparent template, allowing a user to measure along a pair of edges of at least one of a square pane and a frame simultaneously.

The plurality of cut lines is disposed from the top side of the transparent template to the bottom side thereof, such that the user can make demarcations or cuts without removing the template. Each of the plurality of cut lines is a color, such as red. The cut lines stand out visually and are easily distinguishable in order to ensure neatness and squareness while making a quilt frame or a quilt window pane.

A first four of the plurality of cut lines are disposed in a first square shape proximal the northwest corner of the transparent template. These first four cut lines are configured to make the quilt window frame. A second four of the plurality of cut lines are disposed in a second square shape proximal the southwest corner of the transparent template. This second square shape is smaller than the first square shape, and is configured to make the quilt window pane. The remainder of the plurality of cut lines is disposed proximal the southeast corner of the transparent template in straight lines and zigzags. This remainder of the plurality of cut lines is configured to make a quilt trim.

The plurality of first holes is disposed from the top side of the transparent template to the bottom side thereof, forming a square grid pattern. This square grid pattern is disposed such that part of the grid aligns with the L-shaped ruler. The plurality of first holes is configured to mark a fabric to ensure precision of the quilt window frame.

The plurality of second holes is disposed from the top side of the transparent template to the bottom side thereof proximal the center of the transparent template. The plurality of second holes is disposed in a first line from the southwest corner of the transparent template to the northeast corner thereof, or in a second line from the southeast corner of the transparent template to the northwest corner thereof, thus forming an X-shaped pattern in the center of the template. The second holes are spaced closer together than the first holes, and are configured to mark a fabric to create a miniature quilt window for a scrapbook or a piece of jewelry.

The present cathedral window quilt kit also includes a plurality of silk pins, a plurality of T-pins, a cut-and-press pad, a rotary cutter, a snap wrist ruler, and a friction marker. There is a storage and carrying case with a plurality of indentations, with one of the transparent template, the plurality of silk pins, the plurality of T-pins, the cut-and-press pad, the rotary cutter, the snap wrist ruler, and the friction marker selectively receivable within one of the plurality of indentations. The kit will also provide a step-by-step instruction manual, as well as a tutorial video, in order to demonstrate a modernized and alternative quilting technique utilizing all of the elements of the cathedral window quilt kit in conjunction with standard sewing supplies.

Thus have been broadly outlined the more important features of the present cathedral window quilt kit so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
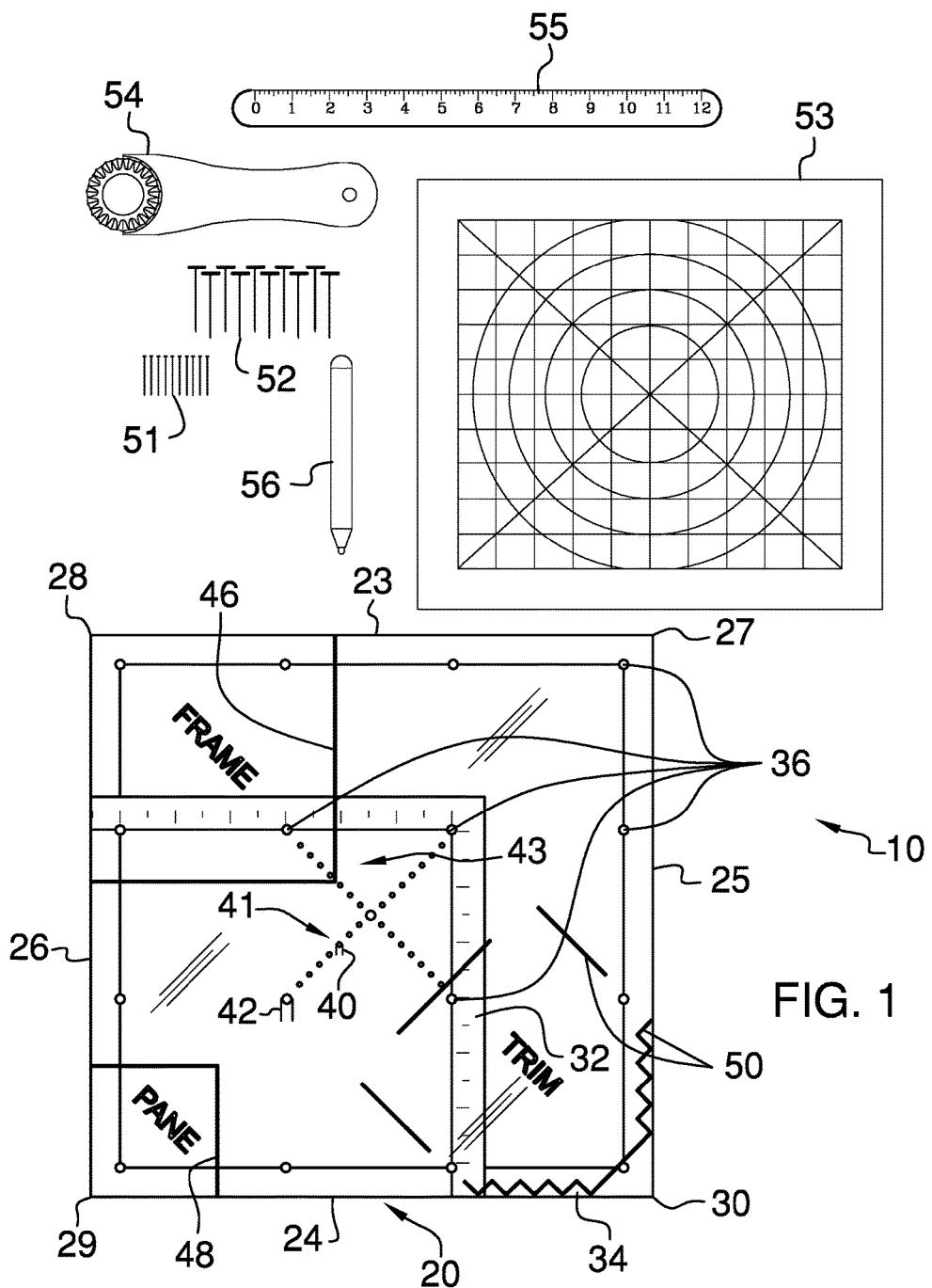
FIG. 1 is a top plan view of a cathedral window quilt kit.
Figure 2:
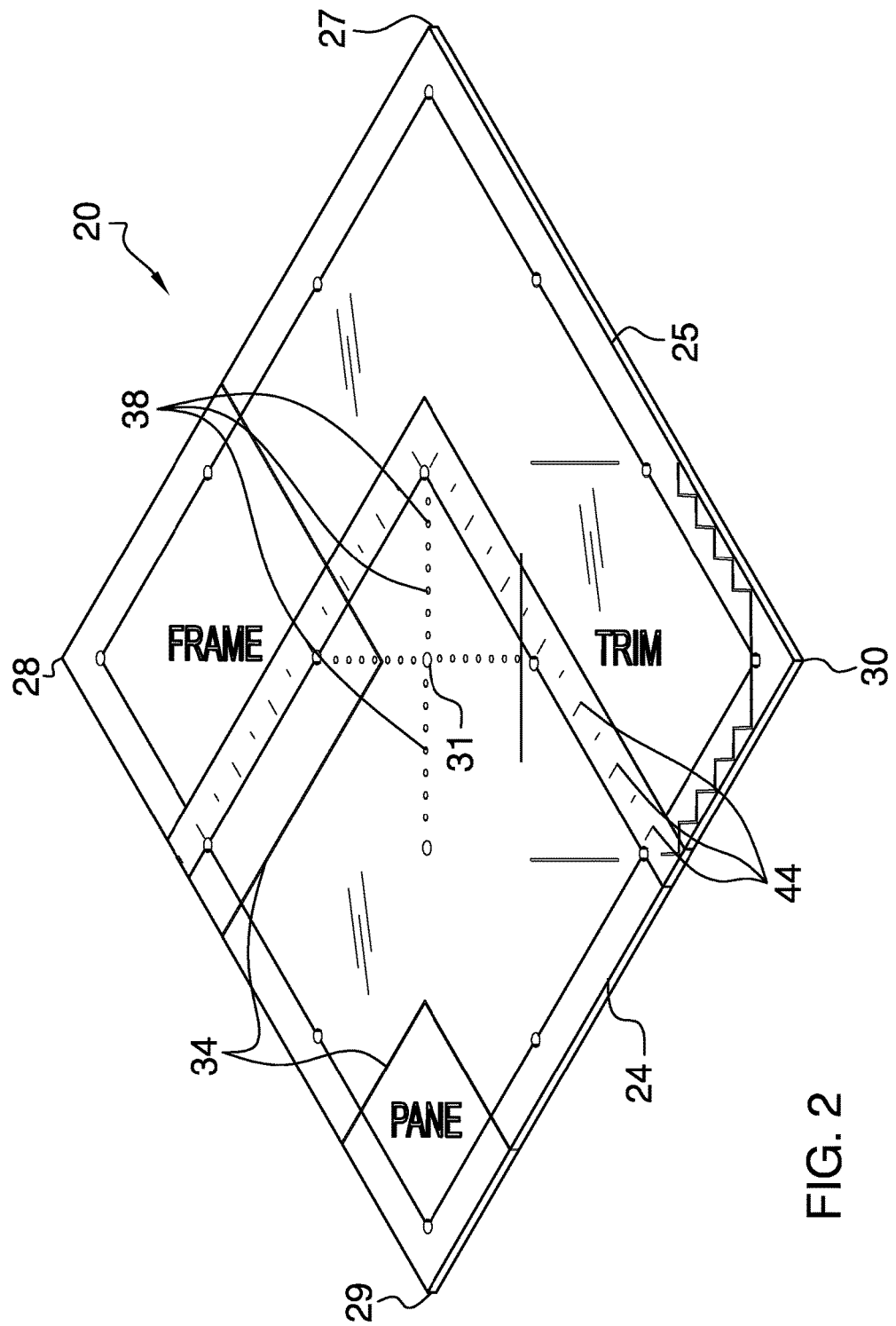
FIG. 2 is an isometric view of a transparent template.
Figure 3:
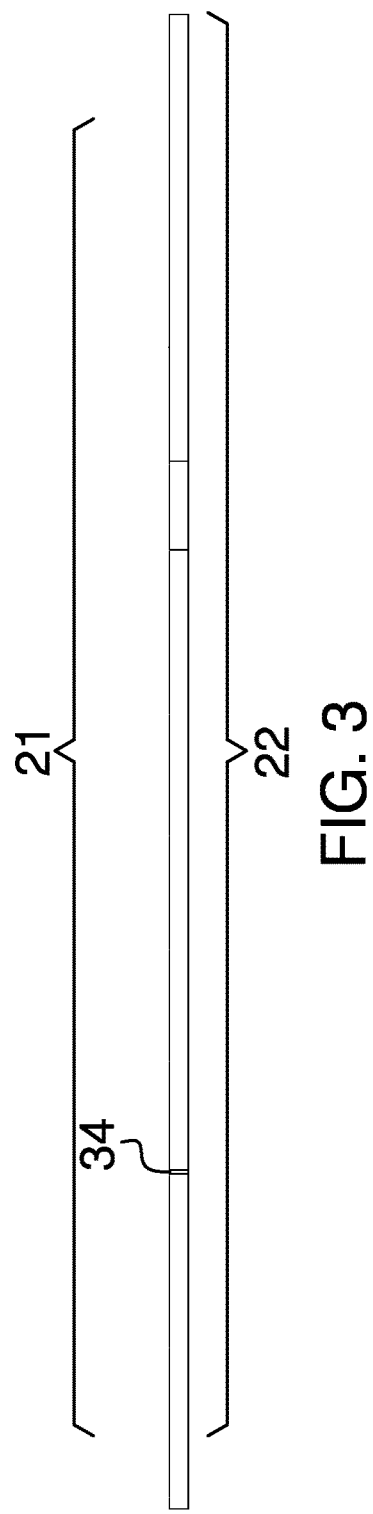
FIG. 3 is a side elevation view of the transparent template.
Figure 4:
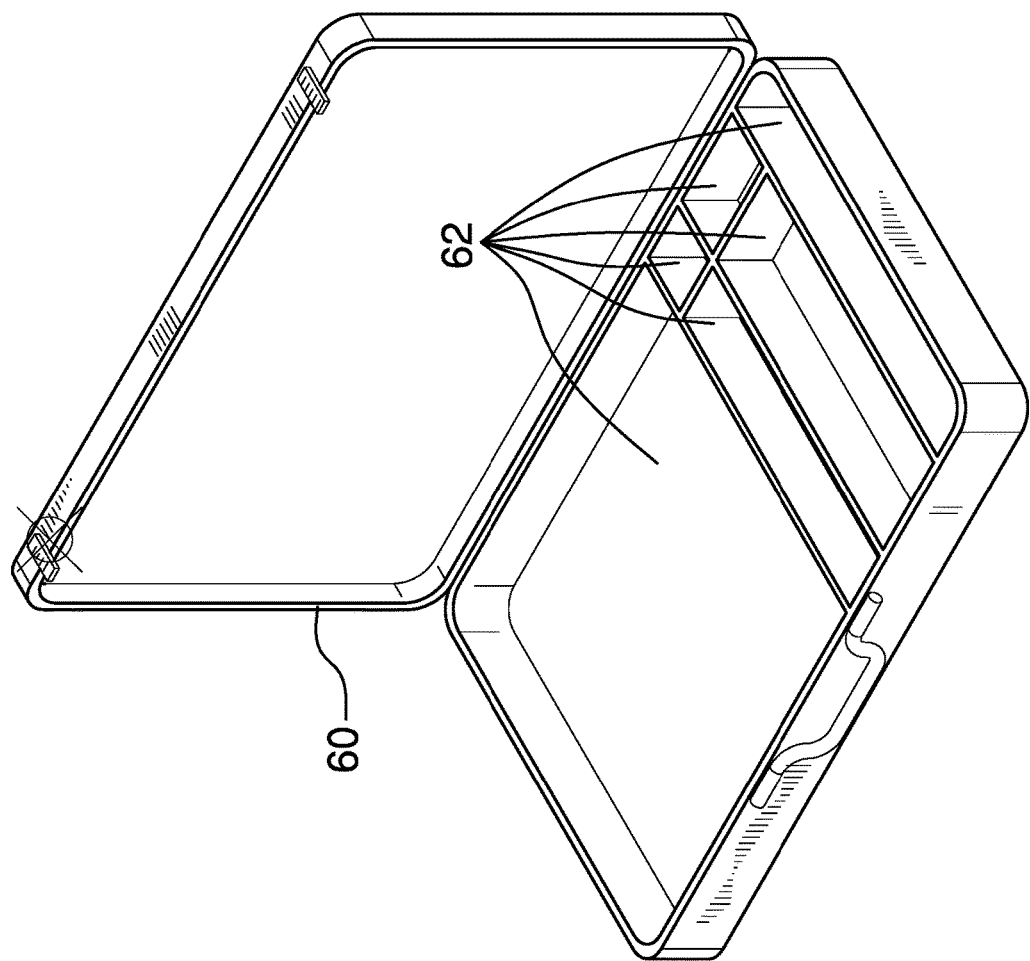
FIG. 4 is an isometric view of a case with a plurality of indentations.

With reference now to the drawings, and in particular FIGS. 1 through 4 thereof, an example of the instant cathedral window quilt kit employing the principles and concepts of the present cathedral window quilt kit and generally designated by the reference number 10 will be described.

Referring to FIGS. 1 through 4 the present cathedral window quilt kit 10 is illustrated. The cathedral window quilt kit 10 includes a transparent template 20 having a top side 21, a bottom side 22, a north side 23, a south side 24, an east side 25, a west side 26, a northeast corner 27, a northwest corner 28, a southwest corner 29, a southeast corner 30, a center 31, an L-shaped ruler 32, a plurality of cut lines 34, a plurality of first holes 36, and a plurality of second holes 38. A circumference of each of the plurality of second holes 40 is less than a circumference of each of the plurality of first holes 42.

The L-shaped ruler 32 has a plurality of demarcations 44 disposed within the top side 21 of the transparent template. The plurality of cut lines 34 is disposed from the top side 21 of the transparent template to the bottom side 22 thereof, and each of the plurality of cut lines is a color. A first four of the plurality of cut lines are disposed in a first square shape 46 proximal the northwest corner 28 of the transparent template 20, wherein the first four cut lines are configured to make a quilt window frame.

A second four of the plurality of cut lines are disposed in a second square shape 48 proximal the southwest corner 29 of the transparent template 20. The second square shape 48 is smaller than the first square shape 46, with the second four cut lines configured to make a quilt window pane.

A remainder 50 of the plurality of cut lines is disposed proximal the southeast corner 30 of the transparent template 20, with the remainder of the plurality of cut lines configured to make a quilt trim.

The plurality of first holes 36 is disposed from the top side 21 of the transparent template to the bottom side 22 thereof, and the plurality of first holes is disposed in a square grid pattern. The plurality of first holes is configured to mark a fabric to ensure precision of the quilt window frame. The plurality of second holes 38 is disposed from the top side 21 of the transparent template to the bottom side 22 thereof proximal the center of the transparent template, and the plurality of second holes is disposed in a first line 41 from the southwest corner 29 of the transparent template to the northeast corner 27 thereof or a second line 43 from the southeast corner 30 of the transparent template to the northwest corner 28 thereof. The plurality of second holes is configured to mark a fabric to create a miniature quilt window for a scrapbook or a piece of jewelry.

The present cathedral window quilt kit 10 also includes a plurality of silk pins 51, a plurality of T-pins 52, a cut-and-press pad 53, a rotary cutter 54, a snap wrist ruler 55, a friction marker 56, and a case 60. The case has a plurality of indentations 62, with one of the transparent template, the plurality of silk pins, the plurality of T-pins, the cut-and-press pad, the rotary cutter, the snap wrist ruler, and the friction marker selectively receivable within one of the plurality of indentations.

What is claimed is:

1. A cathedral window quilt kit comprising:
    a transparent template having a top side, a bottom side, a north side, a south side, an east side, a west side, a northeast corner, a northwest corner, a southwest corner, a southeast corner, a center, an L-shaped ruler, a plurality of cut lines, a plurality of first holes, and a plurality of second holes, wherein a circumference of each of the plurality of second holes is less than a circumference of each of the plurality of first holes;
    wherein the L-shaped ruler has a plurality of demarcations disposed within the top side of the transparent template;
    wherein the plurality of cut lines is disposed from the top side of the transparent template to the bottom side thereof, and each of the plurality of cut lines is a color;
    wherein a first four of the plurality of cut lines are disposed in a first square shape proximal the northwest corner of the transparent template, wherein the first four cut lines are configured to make a quilt window frame;
    wherein a second four of the plurality of cut lines are disposed in a second square shape proximal the southwest corner of the transparent template, wherein the second square shape is smaller than the first square shape, wherein the second four cut lines are configured to make a quilt window pane;
    wherein the remainder of the plurality of cut lines is disposed proximal the southeast corner of the transparent template, wherein the remainder of the plurality of cut lines is configured to make a quilt trim;
    wherein the plurality of first holes is disposed from the top side of the transparent template to the bottom side thereof, and the plurality of first holes is disposed in a square grid pattern, wherein the plurality of first holes is configured to mark a fabric to ensure precision of the quilt window frame;
    wherein the plurality of second holes is disposed from the top side of the transparent template to the bottom side thereof proximal the center of the transparent template, and the plurality of second holes is disposed in a first line from the southwest corner of the transparent template to the northeast corner thereof or a second line from the southeast corner of the transparent template to the northwest corner thereof, wherein the plurality of second holes is configured to mark a fabric to create a miniature quilt window for a scrapbook or a piece of jewelry;
    a plurality of silk pins;
    a plurality of T-pins;
    a cut-and-press pad;
    a rotary cutter;
    a snap wrist ruler;
    a friction marker; and
    a case with a plurality of indentations, wherein one of the transparent template, the plurality of silk pins, the plurality of T-pins, the cut-and-press pad, the rotary cutter, the snap wrist ruler, and the friction marker is selectively receivable within one of the plurality of indentations.

* * * * *